US 7,065,245 B2

(12) United States Patent
Toda

(10) Patent No.: US 7,065,245 B2
(45) Date of Patent: Jun. 20, 2006

(54) IMAGE PROCESSING APPARATUS AND THE METHOD THEREOF

(75) Inventor: Nobuhiro Toda, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 764 days.

(21) Appl. No.: 10/288,933

(22) Filed: Nov. 7, 2002

(65) Prior Publication Data

US 2003/0085991 A1    May 8, 2003

(30) Foreign Application Priority Data

Nov. 8, 2001    (JP)    .......................... P. 2001-343801

(51) Int. Cl.
*G06K 9/00*    (2006.01)
(52) U.S. Cl. ...................... 382/154; 382/162; 382/106
(58) Field of Classification Search .................... None
See application file for complete search history.

(56) References Cited

U.S. PATENT DOCUMENTS

| 5,638,116 | A | 6/1997 | Shimoura et al. |
| 6,169,572 | B1 | 1/2001 | Sogawa |
| 6,552,742 | B1 * | 4/2003 | Seta ............... 348/42 |
| 6,597,807 | B1 * | 7/2003 | Watkins et al. ............. 382/164 |

FOREIGN PATENT DOCUMENTS

| EP | 1 089 231 A2 | 4/2001 |
| EP | 1 089 231 A3 | 6/2003 |
| JP | 2000-009426 A | * 1/2000 |

OTHER PUBLICATIONS

European Search Report dated Jul. 6, 2004.
Andreas Koschan. et al., "Finding Objects In A 3D Environment By Combining Distance Measurement and Color Indexing". Proceedings 2001 International Conference on Image Processing, ICIP 2001, Oct. 7, 2001, pp. 858-861. XP010564995.
Ming X., "Automatic Feature Matching in Uncalibrated Stereo Vision Through the Use of Color", vol. 21, No. 4. Oct. 10, 1997, pp. 355-364. XP004097771.

* cited by examiner

*Primary Examiner*—Mark Zimmerman
*Assistant Examiner*—Alex Liew
(74) *Attorney, Agent, or Firm*—McGinn IP Law Group, PLLC

(57) ABSTRACT

In a stereoscopic color image processing apparatus, a stereo calculation circuit calculates a parallax of respective primary colors by performing a stereo matching with respect to a pair of color images composed of three primary colors. A combination processing section calculates a combined parallax with respect to a picture element block according to an weighted averaging using respective primary color parallaxes and weighting factors.

16 Claims, 4 Drawing Sheets

Ir: COLOR CONSTITUENT OF RED (256GRADATIONS)
Ig: COLOR CONSTITUENT OF GREEN (256GRADATIONS)
Ib: COLOR CONSTITUENT OF BLUE (256GRADATIONS)

IMAGE PROCESSING APPARATUS AND THE METHOD THEREOF

BACKGROUND OF THE INVENTION

1. Field of the Invention

The present invention relates to an image processing apparatus and a method of processing images in which distance data are produced based on a pair of stereoscopic color images.

2. Discussion of Prior Art

A vehicle surrounding condition monitoring system using a stereoscopic camera is known. In this stereoscopic type vehicle surrounding condition monitoring system, small areas having identical brightness characteristic are identified from a pair of images taken by a pair of cameras and distance data are obtained from the amount of relative deviation between both small areas (stereo matching). In a prior stereoscopic type vehicle surrounding condition monitoring system, a monochrome image sensor (CCD or CMOS sensor) are introduced and vehicle surrounding conditions are recognized based on brightness information in monochrome images.

In case of employing color images in place of monochrome ones, since color information is added to the stereoscopic image processing in addition to brightness information, an enhancement of reliability can be expected in the distance data obtained. Additionally, more complicated recognition of circumstances as well as more accurate recognition of traveling conditions are available. However, actually, systematic studies about how a plurality of images of primary colors constituting a color image should be processed and what information should be extracted from the primary color images, have never been made sufficiently.

Further, recently, with an advance of image processing related technologies, adoptions of color images spread in the field of image processing and as a result manufacturing cost of color image sensors is becoming inexpensive year by year. Hence, it is desirable to adopt a color image sensor into the stereoscopic type vehicle surrounding condition monitoring system.

SUMMARY OF THE INVENTION

It is an object of the present invention to enhance a reliability of distance data of a stereoscopic image processing apparatus.

In order to achieve the object, the stereoscopic image processing apparatus comprises parallax calculating means for calculating a primary color parallax with respect to respective color images based on a stereo matching and combination processing means for calculating a combined parallax with respect to a picture element block constituting a calculation unit of the primary color parallax according to a weighted averaging of respective primary color parallaxes using a weight information. The weight information may be predetermined or may be established based on a position of the picture element block or may be established based on a color of an object to be detected. The apparatus further comprises object selecting means for selecting the object to be detected, memory means for memorizing a table showing a relationship between objects and the weight information and designation means for designating the weight information of the objects selected by the object selecting means by referring to the table.

DESCRIPTION OF PREFERRED EMBODIMENT

Figure 1:
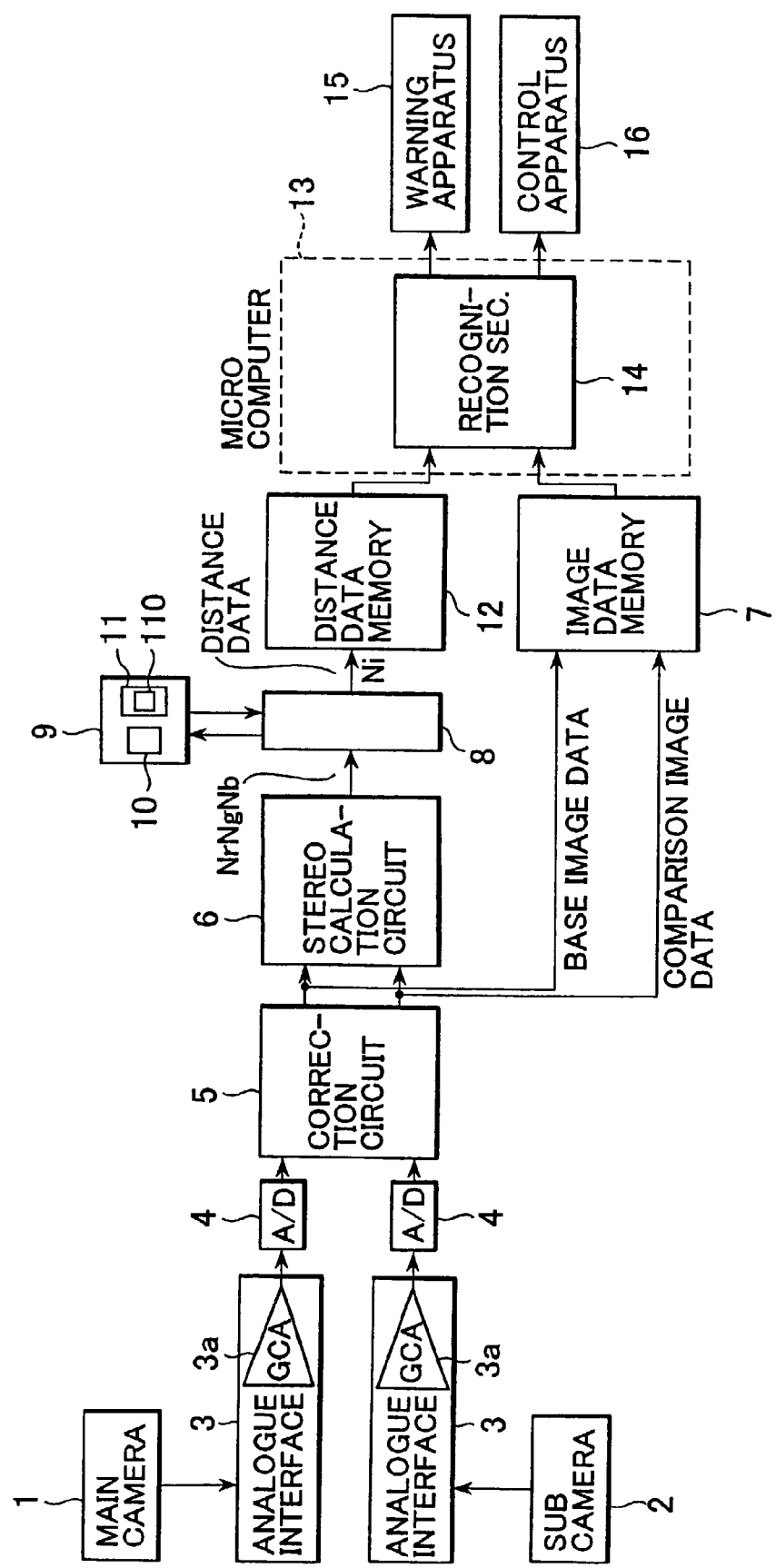
FIG. 1 is a block diagram showing a stereoscopic image processing apparatus according the present invention.

The apparatus shown in FIG. 1 is a stereoscopic image processing apparatus mounted on a vehicle. In the image processing apparatus, a plurality of primary color images (red, green and blue images) constituting a color image are subjected to the stereo matching respectively and an independent parallax is calculated for each primary color image. Further, a combined parallax of a position is calculated by combining positionally identical parallaxes. This combination of parallax is performed in consideration of colors of objects.

A pair of stereoscopic cameras 1, 2 incorporating an image sensor such as CCD, CMOS sensor and the like are mounted in the vicinity of a room mirror of the vehicle to take picture images of a scenery in front of the vehicle. The respective cameras are mounted in a widthwise direction on the vehicle at a specified length of interval (base length of camera). The main camera 1 for taking a base image is mounted on the right side as viewed forwardly and the sub camera 2 for taking a comparison image is mounted on the left side as viewed forwardly.

The respective cameras 1,2 incorporate an independent image sensor for red, green and blue (for example, three colors separation type color CCD). The base image outputted from the main camera 1 is composed of images of three primary colors, R (red) image, G (green) image and B (blue) image. Similarly, the comparison image outputted from the sub camera 2 is composed of images of three primary colors, R image, G image and B image. Therefore, the total number of images outputted from the pair of cameras at one shutter timing is six.

When the camera 1 is synchronized with the camera 2, analogue images outputted from the respective cameras 1, 2 are regulated in an analogue interface 3 respectively so as to agree with an input range of a downstage circuit. A gain control amplifier (GCA) 3a of the analogue interface 3 regulates a balance of brightness of paired image signals. This regulation is performed between the same color images (R, G and B). The paired analogue images regulated in the analogue interface 3 are converted into digital images having a specified number of brightness graduations (for example, 256 graduations in gray scale) by an A/D converter 4.

A correction circuit 5 makes a correction of brightness, a geometric transformation of image and the like for the respective six images of primary colors which constitute the digitalized paired images. In normal cases, since the installation position of the cameras 1, 2 contains more or less positional errors, resultant deviations exist between the left hand and right hand images. Geometrical transformations like a rotation of image or a parallel displacement using the method of the affine transformation are given to the images. These processes ensure a coincidence of horizontal lines (epipoler line) in the paired images. The coincidence of horizontal lines is a premise to accomplish good stereo matchings. Thus, through various image processings, base image data composed of 512 pixels horizontally (in a direction of i coordinate) and 200 pixels vertically (in a direction of j coordinate) are formed from the output signals of the main camera 1. Further, comparison image data having the same vertical length (200 pixels) as that of the base image data and a larger horizontal length (for example 640 pixels) than that of the base image are formed from the output signals of the sub camera 2. The base image data and comparison image data thus corrected in the correction circuit 5 are outputted to a stereo calculation circuit 6 and at the same time those data are stored in an image data memory 7.

The stereo calculation circuit 6 executes a stereo matching based on the base image data and the comparison image data. The parallax is calculated for every picture element block which is a calculation unit of parallaxes. The stereo matching is performed individually for every pair of primary color images having the same color. That is, the stereo matching is performed independently for each of R image (base image and comparison image), G image (base image and comparison image) and B image (base image and comparison image).

In this embodiment, one picture element block as a unit for calculating parallax is composed of 4×4 pixels. Accordingly, the number of picture element blocks contained in the base image is 128×50. That is, 128×50 parallaxes are calculated for one base image. The stereo matching is performed by searching and identifying a picture element block of the comparison image having a correlation with a brightness characteristic of an object picture element block of the base image. As well known, the distance to an object (for example, a vehicle traveling ahead, a lane marker and the like) projected in a stereo image is unconditionally determined only by the amount of horizontal deviation (parallax) of the object between the base image and the comparison image. Therefore, the comparison image is searched on the same horizontal line (epipoler line) as the j coordinate of the object picture element block of the base image. The stereo calculation circuit 6 evaluates the correlation of the brightness characteristic between the base image and the comparison image, while shifting the picture element block of the comparison image by pixel by pixel on the epipoler line.

The correlation of brightness characteristic between picture element blocks can be evaluated by calculating a city block distance for example. When the city block distance is minimum, the picture element blocks have a correlation of brightness with each other. Further, the amount of horizontal deviation between the picture element blocks having a correlation is outputted as a parallax. Japanese Patent Application Laid-open No. Toku-Kai-Hei 5-114009 discloses a hardware construction for calculating the city block distance.

The stereo calculation circuit 6 performs the stereo matching between images having the same primary color (for example, base image (R) and comparison image (R)) and outputs the parallaxes to a combination processing section 8. That is, three parallaxes Nr (parallax calculated from R image), Ng (parallax calculated from G image) and Nb (parallax calculated from B image) are calculated for every picture element of the base image. These parallaxes Nr, Ng, Nb are hereinafter referred to as "primary color parallax" respectively. The stereo calculation circuit 6 introduces a calculation circuit with high speeds because the amount of calculations in the stereo matching processing using color images is far larger than that in the stereo matching processing using monochrome images.

The combination processing section 8 combines three primary color parallaxes Nr, Ng, Nb to produce a combined parallax Ni for a picture element block. Thus obtained combined parallax Ni is assigned to a corresponding position (i, j) on a picture image and a gathering of parallaxes Ni is completed for one frame of picture image. The gathering of parallaxes Ni is stored in a form of distance data (i, j, Ni) in a distance data memory 12. As will be described in detail hereinafter, the combination of primary color parallaxes Nr, Ng, Nb is performed according to the sum of products using parameters (specifically, weight factors of respective colors Or, Og, Ob) obtained from a detection object selecting section 9.

A recognition section 14 of a micro computer 13 recognizes a road profile or a solid object (for example a preceding vehicle) ahead of an own vehicle. The recognition is performed based on the image data stored in the image data memory 7 and the distance data stored in the distance data memory 12. Further, sensor information from a vehicle speed sensor (not shown), a steering angle sensor (not shown), navigation information and the like are referred as required. Japanese Patent Application Laid-open No. Toku-Kai-Hei 5-26554 discloses a specific method of recognizing road profiles or solid objects. In case where it is judged based on the result of this recognition that a warning is required, a warning apparatus 15 such as a monitor lamp or a speaker is operated to call attention to a vehicle driver. Further, when needed, a control apparatus 16 performs miscellaneous vehicle controls such as shifting down in an automatic transmission, reducing power of an engine, applying brakes and the like.

The combination processing section 8 performs a combination of primary color parallaxes Nr, Ng, Nb obtained from the stereo calculation circuit 6 according to the method of the sum of products (in this embodiment, weighted averaging). Specifically, the combined parallax Ni for a picture element block is calculate according to the following formula (1):

$$Ni = Or \cdot Nr + Og \cdot Ng + Ob \cdot Nb \quad (1)$$

where Or is weighting factor for red (R), Og is weighting factor for green (G) and Ob is weighting factor for blue (B).

A set of weighting factors (Or, Og, Ob) is designated by the detection object selecting section 9. The detection object selecting section 9 selects a detection object (for example, no-passing line and the like) desired to be detected at this moment. With respect to the detection object, a plurality of objects (for example, a no-passing line, a rear lamp of a vehicle traveling ahead and the like) are established beforehand. The detection object selecting section 9 selects a detection object from the established objects according to traveling conditions (vehicle speed, steering angle and the like) of the vehicle and outputs the set of weighting factors Or, Og, Ob to the combination processing section 8.

The weighting factors Or, Og, Ob must satisfy the following relationship:

$$Or + Og + Ob = 1 \quad (2)$$

where Or, Og, Ob are $0 \leq Or \leq 1$, $0 \leq Og \leq 1$, $0 \leq Ob \leq 1$, respectively.

In order to raise the accuracy of recognition of the detection object, it is preferable that the set of the weighting factors Or, Og, Ob reflects colors of the object. That is, the respective weighting factors Or, Og, Ob are defined as the following formula (3):

$$Or=Ir/(Ir+Ig+Ib)$$

$$Og=Ig/(Ir+Ig+Ib)$$

$$Ob=Ib/(Ir+Ig+Ib) \qquad (3)$$

where Ir is color constituent of red (R), Ig is color constituent of green (G) and Ib is color constituent of blue (B).

The weighting factors Or, Og, Ob are calculated according to the formula (3) by referring to a color information table 110 which will be described hereinafter.

The detection object selecting section 9 has a micro computer 10 for selecting a detection object and a memory 11. The memory 11 includes ROM in which programs and miscellaneous data are stored and RAM used as a work area of the micro computer 10. Information stored in the memory 11 are specific values of weighting factors Or, Og, Ob obtained from the calculation described above, a color information table 110 and the like.

The set of weighting factors Or, Og, Ob determined by the calculation of the formula (3) are stored and retained in a specified address region (hereinafter referred to as "weight establishment region") of the memory 11 (RAM). When the set of weighting factors Or, Og, Ob are updated, the values written in the weight establishment region are also updated swiftly. The combination processing section 8 has an access to the weight establishment region and acquires a set of weighting factors Or, Og, Ob which should be applied at this moment.

Figure 2:
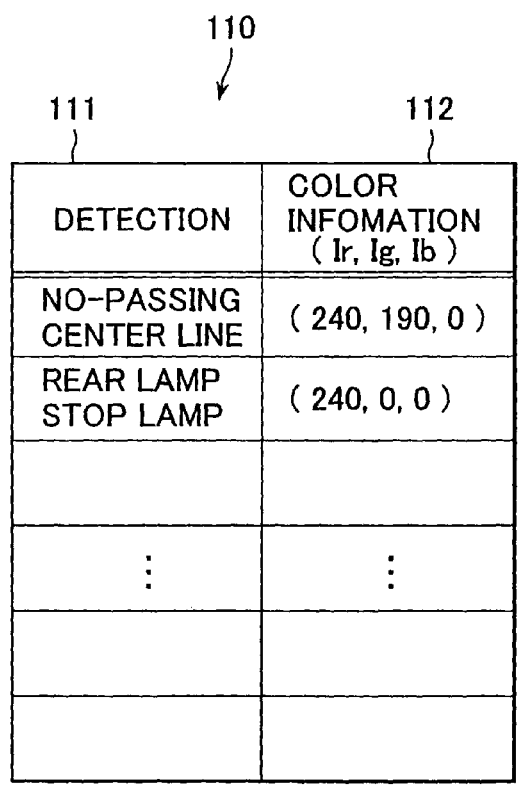
FIG. 2 is a diagram showing an example of a color information table.

FIG. 2 shows an example of the color information table 110. A detection object 111 and color information 112 of the object 111 are written in the color information table 110 in a corresponding manner to each other. The color information 112 is color constituents Ir, Ig, Ib expressed in brightness values having 256 gradations. For example, the no-passing line is established to a color information Ir=240, Ig=190. Ib=0. Further, the rear lamp and stop lamp of a vehicle is established to Ir=240, Ig=0, Ib=0.

Figure 3:
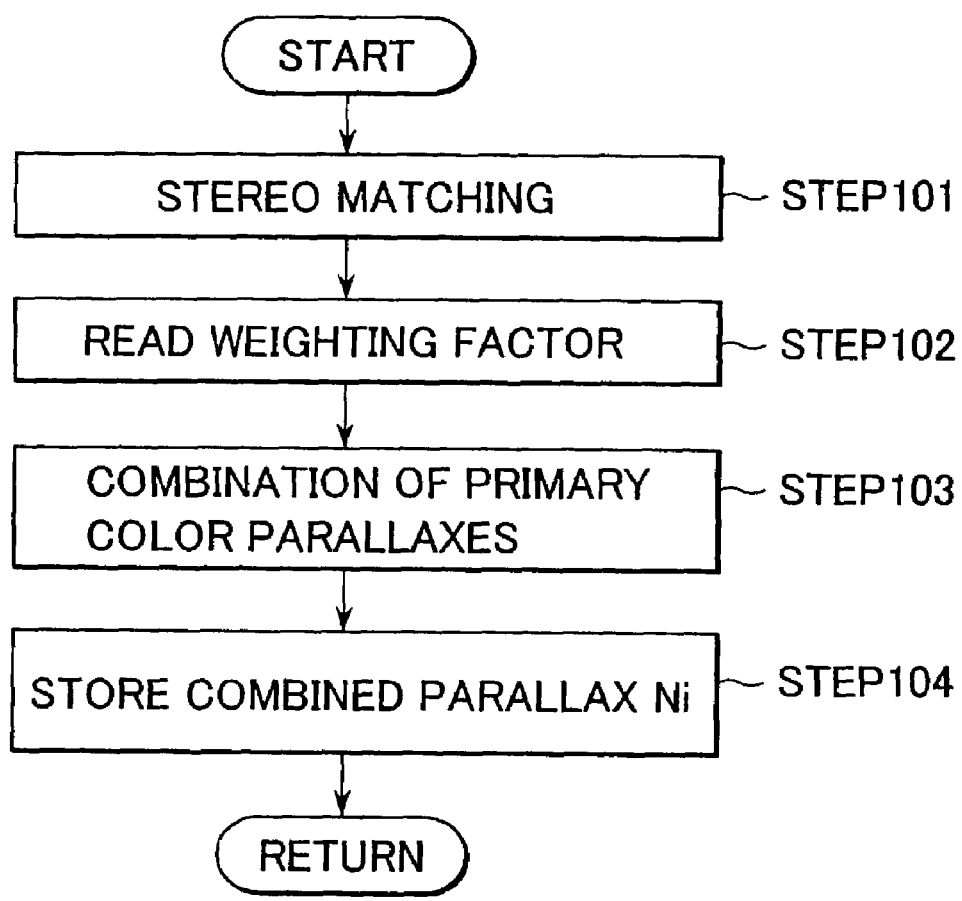
FIG. 3 is a flowchart showing steps of calculating a combined parallax.

Referring to FIG. 3, at a step 101, the stereo calculation circuit 6 reads base data and comparison data stored in the image data memory 7 and performs a stereo matching based on the base data and the comparison data. The stereo matching is performed independently for the respective R, G and B images. As a result, the primary color parallaxes Nr, Ng, Nb are individually calculated. The stereo matching itself is the same as the one performed on the monochrome image.

Next, at a step 102, the combination processing section 8 reads weighting factors Or, Og, Ob from the detection object selecting section 9. In the weight establishment region of the detection object selecting section 9, there are provided weighting factors Or, Og, Ob reflecting colors of the detection object. At a step 103, the combination processing section 8 calculates a combined parallax Ni according to the formula (1) using the primary color parallaxes Nr, Ng, Nb and the weighting factors Or, Og, Ob. Then, the program goes to a step 104 where the combination processing section 8 stores the combined parallax Ni in the distance data memory 12.

Next, shifting to the next picture element block, similar processes are repeated. When the combined parallaxes Ni for one frame of picture image are obtained, distance data (i, j, Ni) of one frame size are stored in the distance memory 12.

Figure 4:
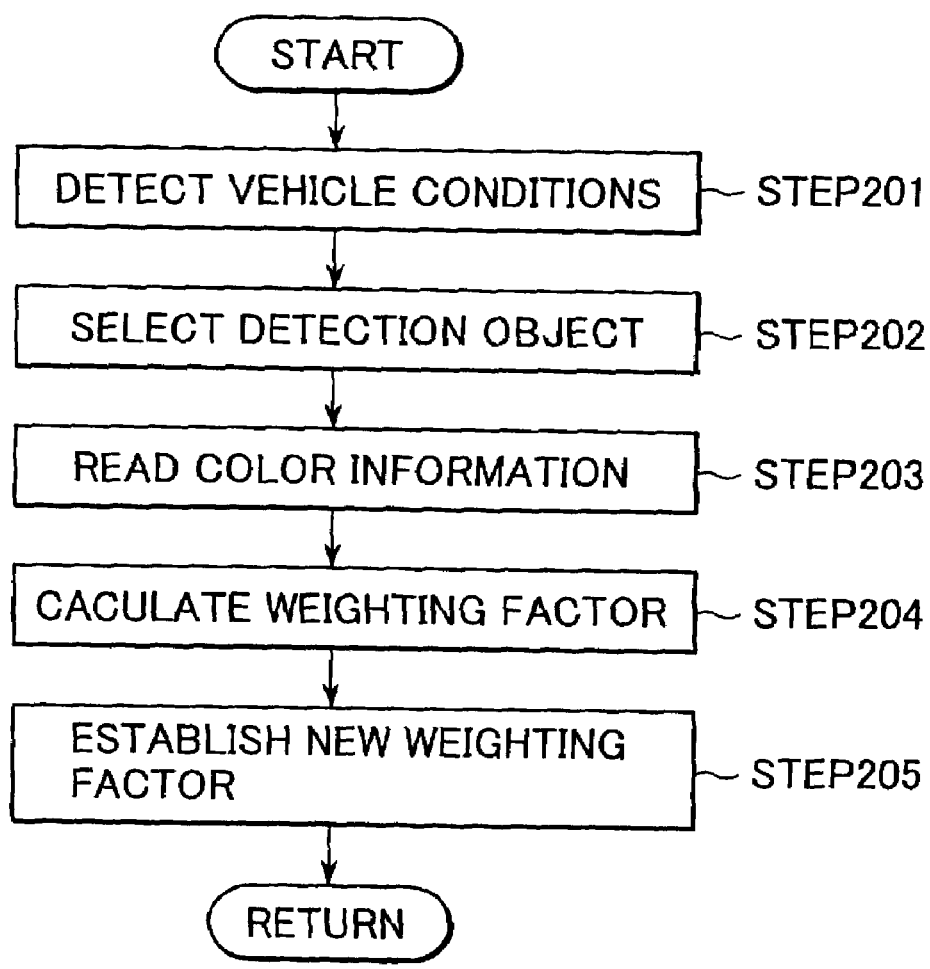
FIG. 4 is a flowchart showing steps of establishing a set of weighting factor.

Referring to FIG. 4, first at a step 201, the detection object selecting section 9 detects vehicle (traveling) conditions such as vehicle speed, acceleration, deceleration, steering angle, turn signal based on the detecting result of miscellaneous sensors not shown. Then, the program goes to a step 202 in which the detection object selecting section 9 selects an object to be detected at this moment. For example, in case where a right hand turn signal lamp is lit or flickers, generally it is estimated that a vehicle is trying a passing or the vehicle is making a right turn. The discrimination between passing and right turn is available by observing vehicle behaviors of the vehicle such as vehicle speeds, acceleration, deceleration and the like. In case where the detection object selecting section 9 judges that the right turn signal lamp is lit for passing, the no-passing line is selected as a detection object. The reason why the no-passing line has been selected as a detection object is to raise an alarm to a vehicle driver when the driver tries a passing actually. In place of the lighting condition of the turn signal lamp, the condition of a turn signal lever may be detected against such a situation as a lamp burned out. Further, the detection object selecting section 9 selects a stop lamp of a preceding vehicle as a detection object when the traveling situation warns the driver against a rear end collision to the preceding vehicle. The detection of the lighting condition of a stop lamp of the preceding vehicle enables to estimate a reduction of vehicle speeds of the preceding vehicle and to give a warning to the driver.

Then, the program goes to a step 203 where the detection object selecting section 9 looks up to the color information table 110 to obtain color information about the object. After that, the program goes to a step 204 where the detection object selecting section 9 calculates a set of weighting factors Or, Og, Ob according to the formula 3 using the color information (color constituent).

For example, according to the embodiment of the present invention, the color constituent of the color information table is specified as Ir=240, Ig=190, Ib=0(see FIG. 2). Accordingly, the weighting factors are Or=240/(240+190+0), Og=190/(240+190+0), Ob=0. Further, with respect to the stop lamp, the color constituent is specified as Ir=240, Ig=240, Ib=0 (see FIG. 2) .In this case, the weighting factors are Or=240/(240+0+0), Og=0, Ob=0.

Then, at a step 205, the detection object selecting section 9 establishes the weighting factors calculated at the step 204 as a new set of weighting factors. Specifically, the weight establishment area of the memory 11 is rewritten by the new set of weighting factors. In case where a particular detection object is not selected, the detection object selecting section 9 sets the default value to Or=Og=Ob=⅓.

The detection object selecting section 9 selects the detection objects according to the traveling situations of the vehicle, calculates the set of the weighting factors Or, Og, Ob according to the selected detection objects and updates it for every cycle of the routine.

According to the embodiment of the present invention, since the combined parallax Ni is calculated based on the primary color parallaxes Nr, Ng, Nb calculated for an individual primary color, more reliable distance data can be obtained. In the stereoscopic image processing based upon prior monochrome images, since there is no color information in the input information, the sum of brightnesses of primary colors is only brightness information. Hence, even in case where the brightnesses of respective primary colors suddenly changes, as far as there is no change in the sum of the brightnesses, primary color based brightness edges are not recognized.

On the other hand, according to the embodiment, in the stereoscopic image processing based on color images, since a picture image is obtained for respective primary colors constituting the color image, brightness edges can be recognized for every primary color and the primary color parallaxes Nr, Ng, Nb can be separately calculated based on the brightness edges. Thus obtained three primary colors Nr, Ng, Nb do not always have the same value. This disagreement of primary color parallaxes is caused by a background scenery other than an object contained in the picture element block or differences of color constituent values of the background scenery for every primary color. For example, in case where the object is red and the background is green, the result of the stereoscopic image recognition with respect to R image reflects a distance to the object. Further, since the background scenery does not contain red constituents, the existence of the background scenery does not affect the result of recognition with respect to R image. However, since the background scenery contains a lot of green constituents, the result of recognition with respect to G image reflects a distance to the background scenery. As a result, the primary color parallax Ng for green disagrees with the primary color parallax Nr for red. According to the embodiment of the present invention, when such a disagreement between the primary parallaxes occurs, a combined parallax Ni can be effectively determined by producing the sum of products of the primary color parallaxes Nr, Ng, Nb.

Further, according to the embodiment, since the combined parallax Ni takes color information of the detected object into consideration, the distance data with high reliability can be calculated. In case where the color of the object is characteristic, for example in case where the color of the object remarkably differs from the surrounding colors, the embodiment of the present invention is particularly effective.

The embodiment can be applied to color cameras using four complementary color filters (cyan, magenta, yellow and green). Since the color cameras using the complementary color filters have a high light utility efficiency, the cameras are advantageous in obtaining high resolution images and in processing dark images. However, in order to employ the aforesaid miscellaneous circuits as they are, even in case of the cameras using the complementary color filters, outputted image data must be transformed into RGB color image data.

Further, according to the embodiment, the combination processing section 8 and the detection object selecting section 9 are independently provided. However, the combination processing section 8 and the detection object selecting section 9 are not necessarily independently provided from the view point of hardware construction. For example, the same function as the combination processing section 8 and the detection object selecting section 9 may be given to the program of the micro computer 13.

Further, in this embodiment, the weighting factors Or, Og, Ob are calculated according to the ratio of color constituent value of the object shown in the formula 3. The weighting factors Or, Og, Ob may be determined in other ways, for example, by the arithmetic averaging. In case where any particular detection object is not selected, the default value Or=Og=Ob=1/3 is used and this means that the arithmetic averaging is substantially performed.

Further, in this embodiment, the color constituent values are stored as the color information 112 in the color information table 110 as shown in FIG. 2 and the weighting factors Or, Og, Ob are calculated from the color constituent values. However, the weighting factors may be calculated for each of objects beforehand and may be stored as the color information 112 in the color information table 110 to reduce the amount of calculations in the detection object selecting section 9.

Further, an object to be detected may be changed according to areas of a picture image. For example, when the stereo matching is performed in an upper area of a picture image, the detection object is established to traffic signals or signposts. When the stereo matching reaches a lower region of the picture image, the detection object is changed to lane markers of roads, whereby different kinds of detection objects can be detected simultaneously in one frame of picture image. As a result, the distance data with respect to a plurality of detection objects can be calculated efficiently. In this case, the detection object selecting section 9 holds sets of weighting factors Or, Og, Ob for every object such that the respective sets of weighting factors Or, Og, Ob correspond to an area to be applied. The area is referred to as "region designation information". The combination processing section 8 recognizes a region of image picture to which a set of primary color parallaxes Nr, Ng, Nb belongs and reads the set of weighting factors Or, Og, Ob from the detection object selecting section 9. The aforesaid area designation information does not necessarily have a form of data. For example, the region designation information may include promises such as an order of storing into the memory, a storing area, an order of reading out by the combination processing section 8, an order of calculation and the like. That an effect as if the weighting factors are used independently for every area is obtained by making such promises.

In summary, according to the present invention, in performing the stereo matching of a pair of color images, the primary color parallax is calculated for every primary color image. A combined parallax is calculated by the sum of products of the primary color parallax for respective primary colors. As a result, the reliability of the distance data increases.

The disclosure of Japanese Patent Application No. Togan 2001-343801 filed on Nov. 8, 2001 including the specification, drawings and abstract is incorporated herein by reference in its entirety.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. An image processing apparatus for performing a stereo matching on a pair of color images constituted by a plurality of primary colors, comprising:
   parallax calculating means for calculating a primary color parallax with respect to each primary color images based on said stereo matching; and
   combination processing means for calculating a combined parallax with respect to a picture element block constituting a calculation unit of said primary color parallax according to a sum of products of said primary color parallaxes.

2. The apparatus according to claim 1, wherein said combination processing means calculates the combined parallax according to said primary color parallaxes and weight information for each primary color as reflecting colors of said object to be detected.

3. An image processing apparatus for performing a stereo matching on a pair of color images constituted by a plurality of primary colors, comprising:
- parallax calculating means for calculating a primary color parallax with respect to each primary color images based on said stereo matching; and
- combination processing means for calculating a combined parallax with respect to a picture element block constituting a calculation unit of said primary color parallax according to a weighted averaging of respective primary color parallaxes using a weight information.

4. The apparatus according to claim 3, wherein said weight information is predetermined.

5. The apparatus according to claim 3, wherein said weight information is established based on a position of said picture element block.

6. The apparatus according to claim 3, wherein said weight information is established based on a color of an object to be detected.

7. The apparatus according to claim 3, further comprising:
- object selecting means for selecting said object to be detected;
- memory means for memorizing a table showing a relationship between objects and said weight information; and
- designation means for designating said weight information of said objects selected by said object selecting means by referring to said table.

8. The apparatus according to claim 3, wherein said weight information comprises color constituents expressed in brightness values having a predetermined gradation.

9. An image processing method of performing a stereo matching on a pair of color images constituted by a plurality of primary colors, comprising:
- calculating a primary color parallax with respect to each primary color images based on said stereo matching; and
- calculating a combined parallax with respect to a picture element block constituting a calculation unit of said primary color parallax according to a sum of products of said primary color parallaxes.

10. The method according to claim 9, wherein said calculating said combined parallax includes calculating the combined parallax according to said primary color parallaxes and weight information for each primary color as reflecting colors of said object to be detected.

11. An image processing method of performing a stereo matching on a pair of color images constituted by a plurality of primary colors, comprising:
- calculating a primary color parallax with respect to each primary color images based on said stereo matching; and
- calculating a combined parallax with respect to a picture element block constituting a calculation unit of said primary color parallax according to a weighted averaging of respective primary color parallaxes using weight information.

12. The method described in claim 11, wherein said weight information is predetermined.

13. The method described in claim 11, wherein said weight information is established based on a position of said picture element block.

14. The method described in claim 11, wherein said weight information is established based on a color of an object to be detected.

15. The method described in claim 11, further comprising:
- selecting said object to be detected;
- memorizing a table showing a relationship between said objects and said weight information; and
- designating said weight information of said objects selected by said object selecting means by referring to said table.

16. The method according to claim 11, wherein said weight information comprises color constituents expressed in brightness values having a predetermined gradation.

* * * * *